United States Patent [19]

Rozmus et al.

[11] 3,768,718

[45] Oct. 30, 1973

[54] FINE WIRE BUTT WELDER

[75] Inventors: Walter J. Rozmus, Hubbardsville; Matt T. Rozmus, Barneveld, both of N.Y.

[73] Assignee: Kelsey-Hayes Company, Romulus, Mich.

[22] Filed: Dec. 1, 1971

[21] Appl. No.: 203,677

Related U.S. Application Data

[60] Division of Ser. No. 834,781, June 19, 1969, Pat. No. 3,653,571, which is a continuation-in-part of Ser. No. 766,813, Oct. 11, 1968 Pat. No. 3,606,131.

[52] U.S. Cl. .................. 228/3, 29/470.1, 140/113, 228/4
[51] Int. Cl. ............................................ B23k 21/00
[58] Field of Search ............................ 228/3, 4, 5; 29/470.1; 140/113; 81/352

[56] References Cited

UNITED STATES PATENTS

| | | | |
|---|---|---|---|
| 2,863,344 | 12/1958 | Barnes | 228/3 |
| 2,891,430 | 6/1959 | Johnson | 228/3 |
| 2,923,183 | 2/1960 | Johnson | 228/3 |
| 3,044,328 | 7/1962 | Zysk | 228/3 |
| 3,336,655 | 8/1967 | Rozmus | 29/470.1 |

Primary Examiner—J. Spencer Overholser
Assistant Examiner—Robert J. Craig
Attorney—Ernest A. Beutler

[57] ABSTRACT

A fine wire welding machine for cold butt welding small diameter wires through a multiple upset technique. The machine includes a loading mechanism for accurately positioning the fine wire strands for subsequent engagement with the welding dies and the welding dies are movable in a plane parallel to their abutting faces for shearing the wires and aligning the end of the wire from one spool with the end of the wire from another spool for the subsequent welding technique. An improved operating mechanism is incorporated for operating the dies for movement in a predetermined sequence whereby the dies first move into gripping relation with the respective wire ends, the dies then move together to upset the wire ends, next the dies release the wire ends while still held in the upset position and finally the dies retract from their upset position for a repeat of the cycle.

2 Claims, 19 Drawing Figures

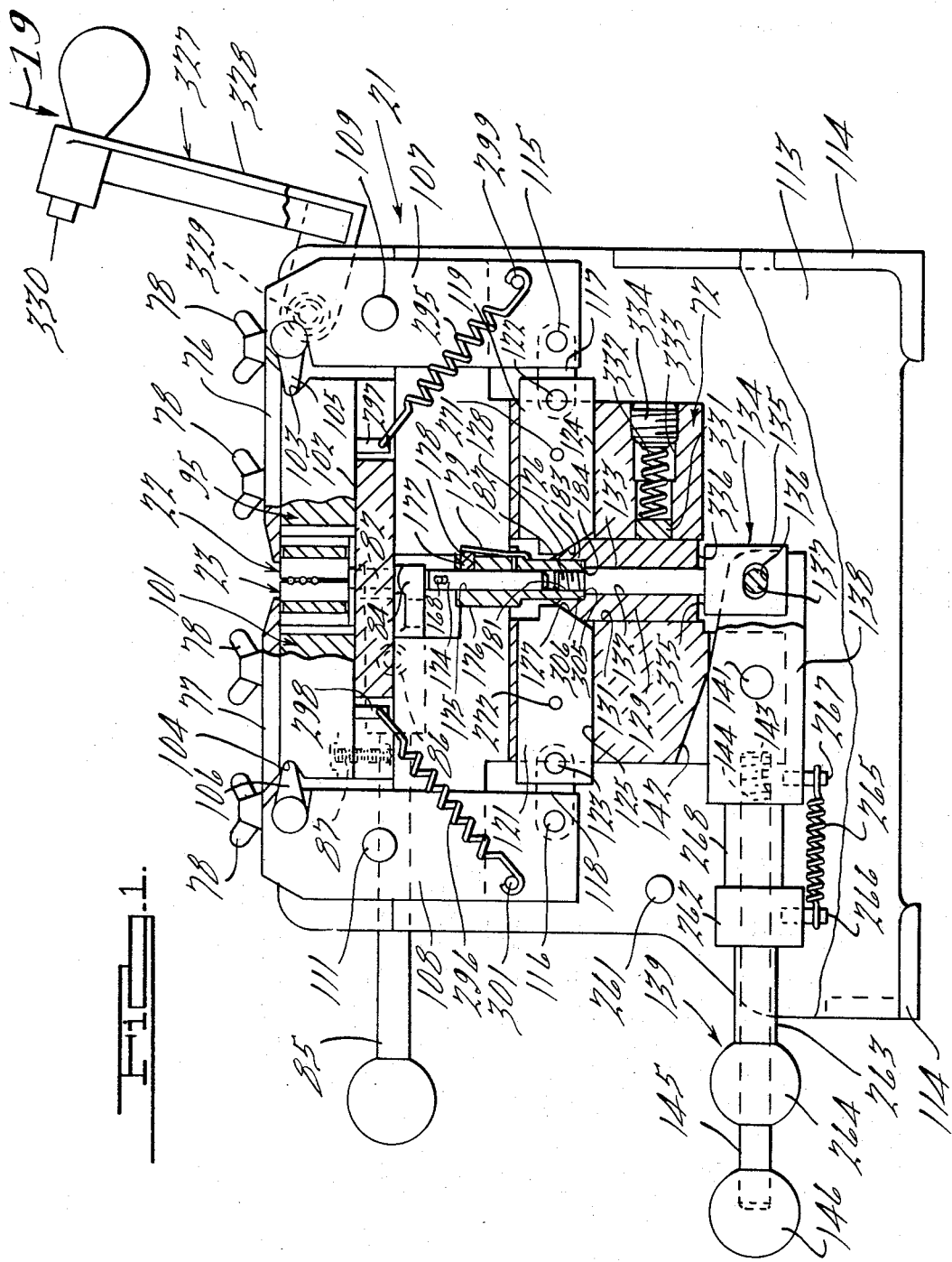

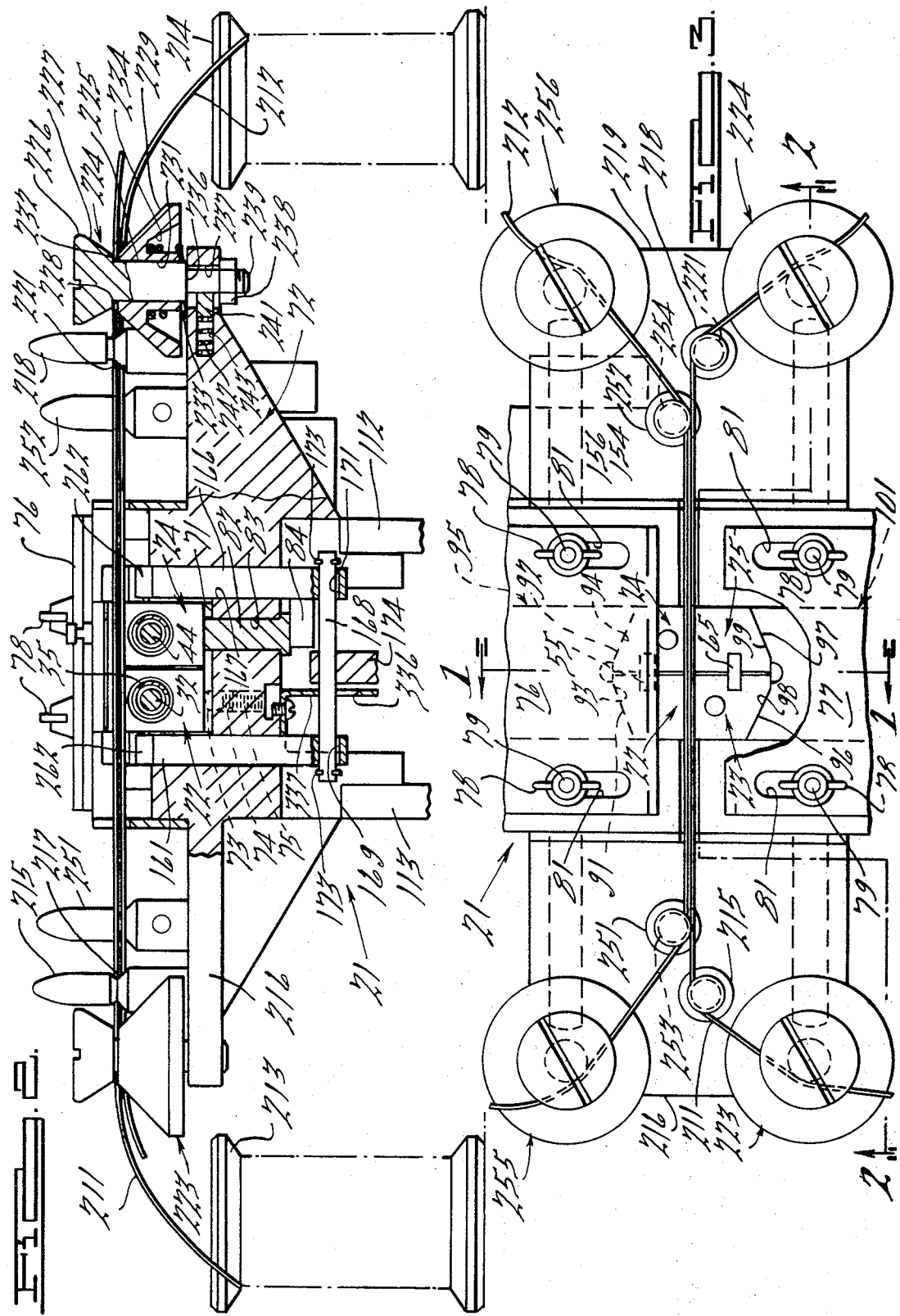

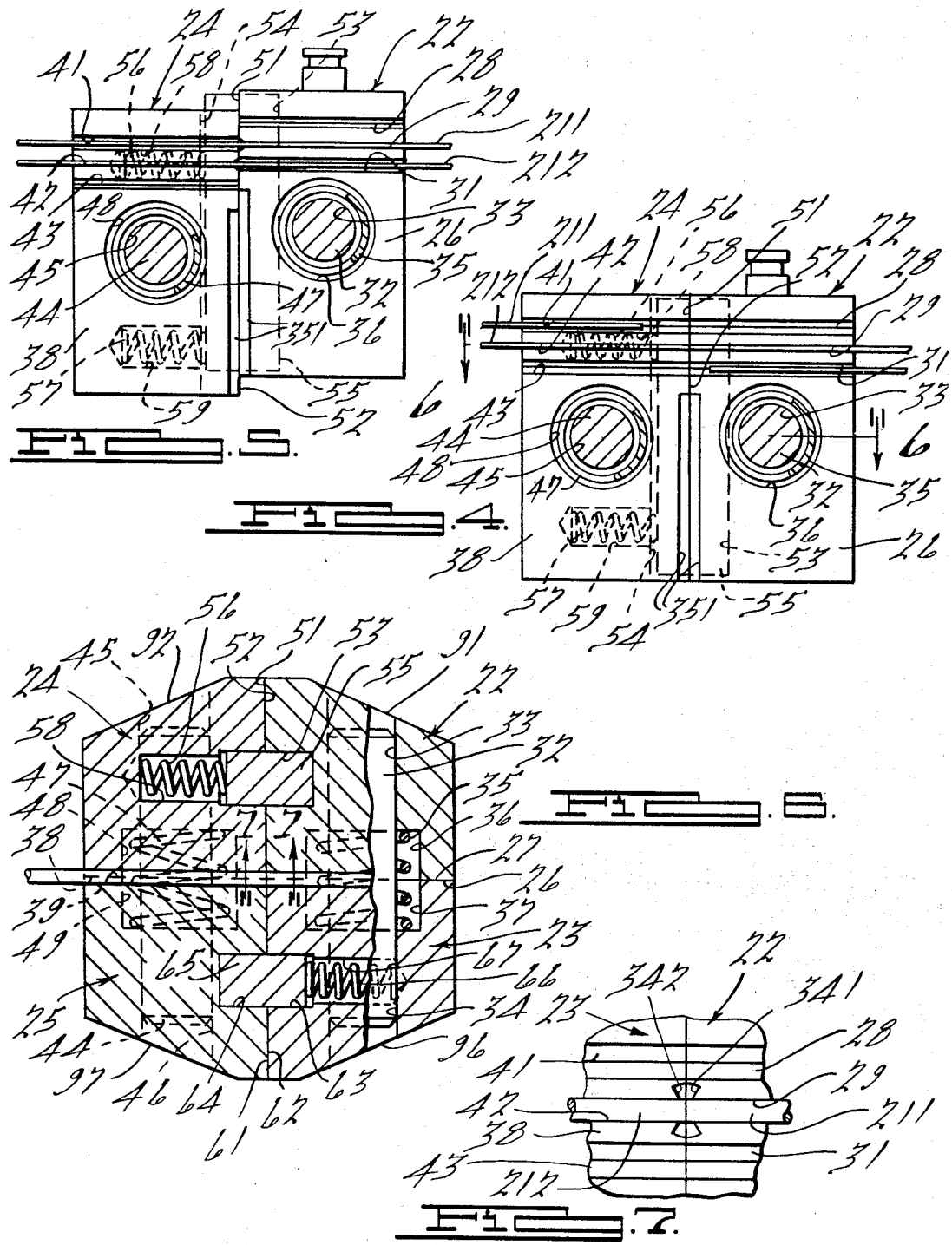

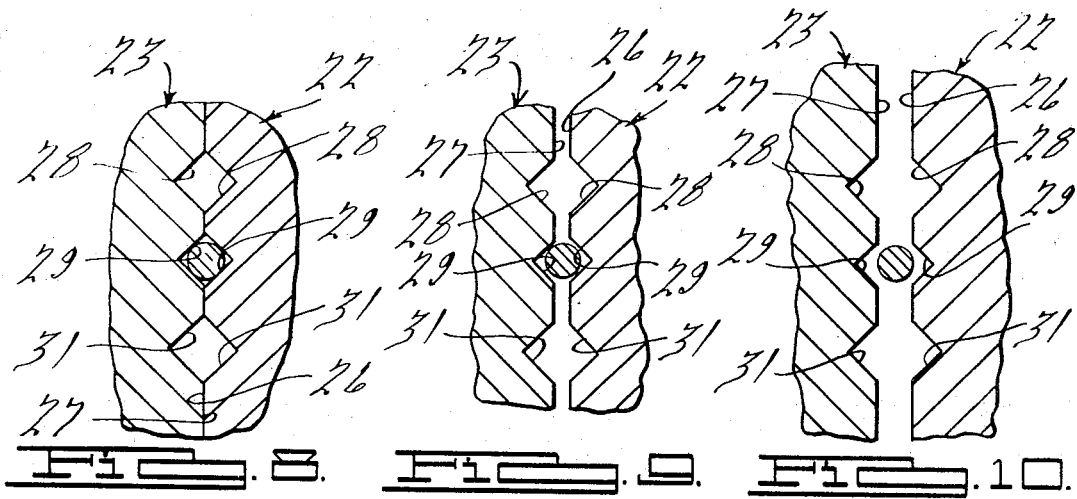
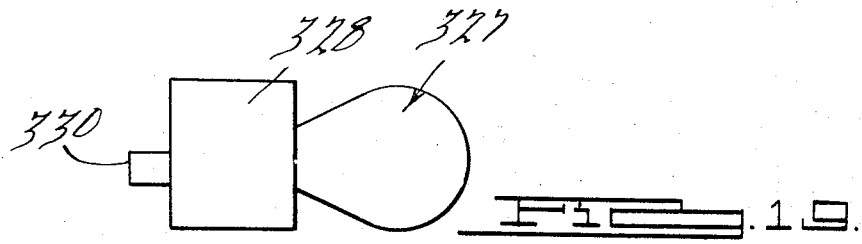
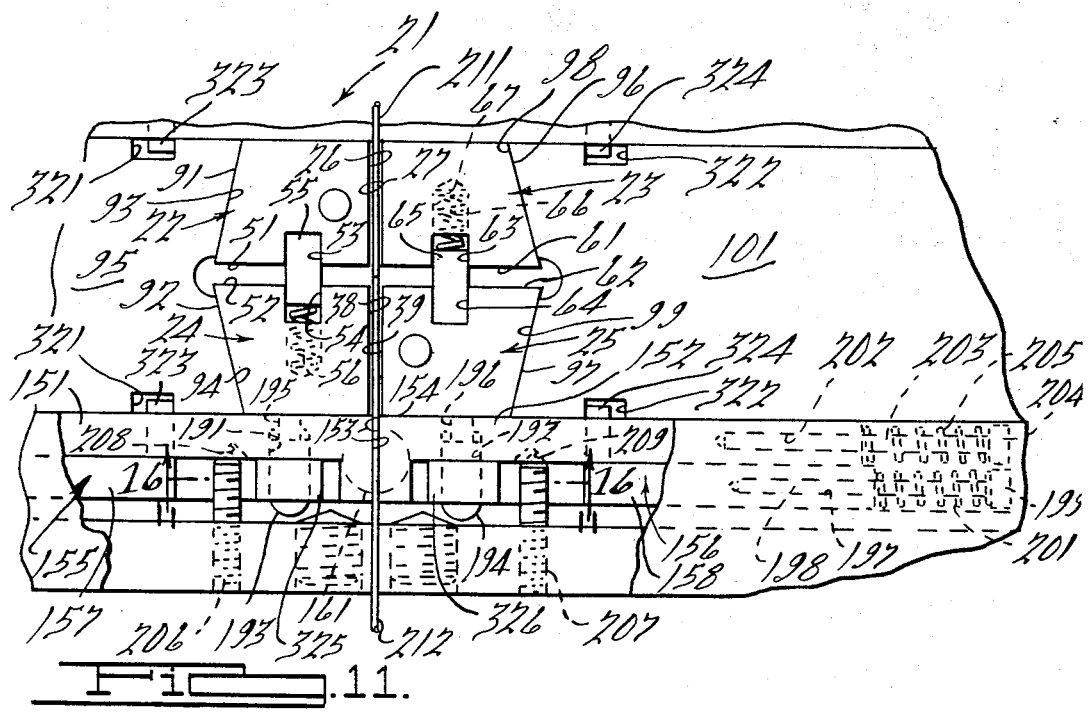

FINE WIRE BUTT WELDER

RELATED APPLICATIONS

This application is a division of application Ser. No. 834,781, filed June 19, 1969, now U.S. Pat. No. 3,653,571, which was a continuation-in-part of Ser. No. 766,813, filed Oct. 11, 1968, now U.S. Pat. No. 3,606,131.

BACKGROUND OF THE INVENTION

This invention relates to an improved machine for accomplishing cold butt welds and more particularly to an improved, multiple upset cold wire butt welder.

In the welding machine shown in our aforenoted United States patent application, pairs of dies are supported for relative movement with the dies of each pair being relatively movable between an opened and a gripping position and the pairs of dies being movable toward and away from each other between a normal and a welding position. The sequence of operation of the dies was controlled by cam members in the form of V-blocks that operated the dies. After the dies of the pairs are in their gripping position and the pairs of dies are in their welding position, it is desirable to have the dies of the pairs be released from their gripping position prior to the movement of the pairs of dies away from each other. If this is not accomplished, the drag of the pairs of dies on the wire ends creates a tensile force on the wire which may tear apart the already made weld. This problem is most likely to occur after the first upset when the weld is at its weakest.

It is, therefore, a principal object of this invention to provide an improved butt welding machine.

It is another object of this invention to provide a cold butt welding machine having the desired die sequence operation.

SUMMARY OF THE INVENTION

A butt welding machine embodying this invention includes a first and second pair of dies. Each pair of dies is supported for relative movement toward and away from each other between an opened position and a gripping position. The dies of the pairs of dies are adapted to hold respective pieces to be welded when the dies are in their gripping position and are adapted to move freely relative to the pieces when the dies are in their opened position. The dies are supported for relative movement toward and away from each other between a spaced position and a welding position. Means are provided for moving the dies relative to each other in a predetermined sequence -- first from an opened spaced position to a gripping spaced position, then to a gripping welding position, next to an opened welding position, and finally back to an opened spaced position.

BRIEF DESCRIPTION OF THE DRAWINGS

FIG. 1 is a transverse cross-sectional view of a fine wire butt welding apparatus embodying this invention and taken along the line 1—1 of FIG. 3.

FIG. 2 is a cross-sectional view taken transversely to the view of FIG. 1 and generally along the line 2—2 of FIG. 3.

FIG. 3 is a top plan view, with a portion broken away, of the butt welding machine.

FIG. 4 is an enlarged inverted cross-sectional view of the die set in a position corresponding to that shown in FIG. 2.

FIG. 5 is an enlarged cross-sectional view, in part similar to FIG. 4, and shows the die set at an intermediate step during the loading procedure.

FIG. 6 is a cross-sectional view taken along the line 6—6 of FIG. 4.

FIG. 7 is a further enlarged cross-sectional view taken along the line 7—7 of FIG. 6.

FIG. 8 is an enlarged view of the encircled area in FIG. 1 showing the wire receiving cavities of the die set.

FIG. 9 is a cross-sectional view, in part similar to FIG. 8, showing the dies in a released position.

FIG. 10 is a cross-sectional view, in part similar to FIGS. 8 and 9, showing the dies in their fully released or loading position.

FIG. 11 is a partially schematic top plan view of the machine, with portions broken away and other portions removed, and showing the dies in an opened spaced position prior to an initial upset of the wire ends to be welded and corresponds to the die position shown in FIG. 9.

FIG. 19 is a view taken generally in the direction of the arrow 19 in FIG. 1 and shows the die depressing mechanism.

DETAILED DESCRIPTION OF THE PREFERRED EMBODIMENT

Figure 12:
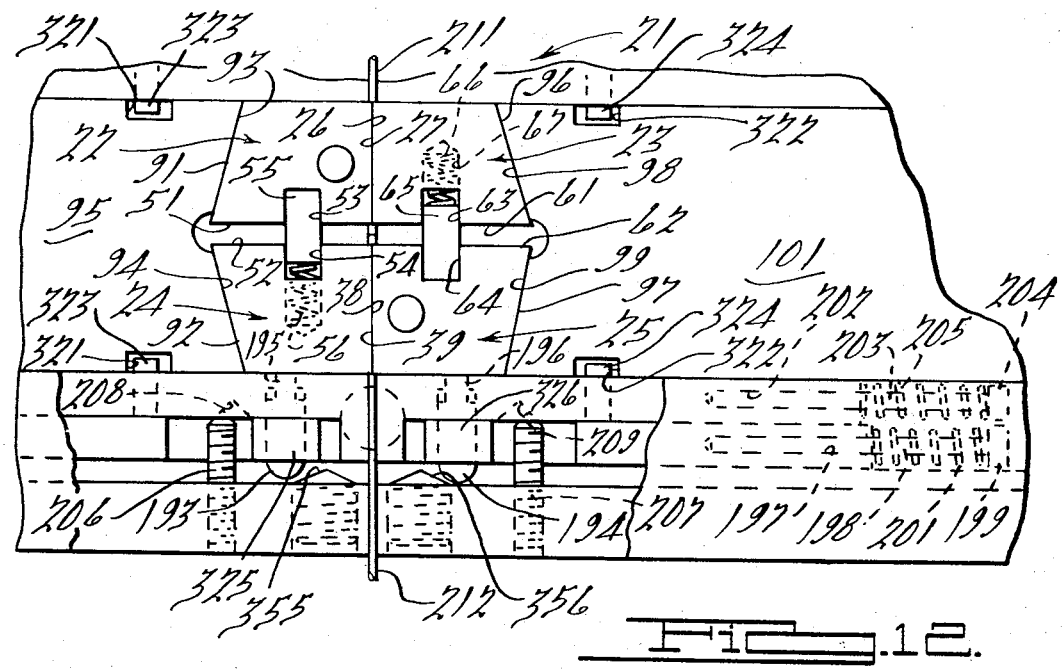
FIG. 12 is a view, in part similar to FIG. 11, and shows the dies in their gripping spaced position and corresponds to the die position shown in FIG. 8.

In the drawings, the reference numeral 21 represents generally a multiple upset fine wire butt welding machine embodying this invention. The machine 21 is particularly adapted for forming multiple upset cold butt welds on ultra fine wires; that is, wires having a diameter less than 0.004 inches and as small as 0.0025 inches, but the features of this invention may be used with machines for welding larger diameter wires.

The machine 21 includes a first pair of welding dies 22 and 23 and a second pair of welding dies 24 and 25. These dies are shown in most detail in FIGS. 4 through 7 and will be described by particular reference to those figures. The dies 22 and 23 have facing surfaces 26 and 27, respectively. First, second and third grooves 28, 29 and 31 are formed in each of the surfaces 26 and 27. The grooves 28 and 31 are of larger size than the grooves 29 and preferably the grooves have a configuration of the type disclosed in the U.S. Pat. No. 3,336,655, entitled "Die Structure", issued Aug. 27, 1967, in the name of Walter J. Rozmus. The grooves 29 are sized so as to accurately grip the wire diameter or range of diameters to be welded while, as has been noted, the grooves 28 and 31 are larger in size.

A first pin 32 extends within aligned bores 33 and 34 formed in the dies 22 and 23, respectively. The bores 33 and 34 are disposed perpendicularly to the surfaces 26 and 27 and the pin 32 coacts with the bores 33 and 34 to accurately align the grooves 28, 29 and 31 in the die 22 with the like grooves formed in the die 23. The pin connection between the dies 22 and 23, however, permits the dies 22 and 23 to move in a direction perpendicular to the surfaces 26 and 27 from an opened position to a closed, gripping position wherein the surfaces 26 and 27 are abuttingly engaged. In this closed, gripping position, the respective grooves 28, 29 and 31 of the dies 22 and 23 coact to define longitudinally extending wire receiving cavities. A coil compression spring 35 encircles the pin 32 and is received in enlarged counterbores 36 and 37 formed in the dies 22 and 23 adjacent the surfaces 26 and 27. The coil spring 35 normally urges the die surfaces 26 and 27 away from each other.

The dies 24 and 25 of the second pair of dies also have facing surfaces 38 and 39 in which first, second and third grooves 41, 42 and 43 are formed. The grooves 41 and 43 are larger than the groove 42. The respective grooves coact to define first, second and third wire receiving cavities when the surfaces 38 and 39 are in abutting relationship. Grooves 42 are sized to define a cavity which will closely engage the wire to be welded while the grooves 41 and 43 define larger cavities.

A second pin 44 extends through complementary bores 45 and 46 formed in the dies 24 and 25 perpendicularly to the surfaces 38 and 39. The pin 44 and bores 45 and 46 coact to align the respective grooves 41, 42 and 43 of the dies 24 and 25 and to constrain the dies 24 and 25 for movement relative to each other in a direction perpendicular to the surfaces 38 and 39 from an opened position to a closed, gripping position wherein the surfaces 38 and 39 abut each other. A coil compression spring 47 is received in counterbores 48 and 49 formed in the dies 24 and 25, respectively, and encircles the pin 44 for urging the dies 24 and 25 to their opened positions.

The dies 22 and 24 have facing surfaces 51 and 52, respectively, which surfaces are disposed at right angles to the surfaces 26 and 38. Keyways 53 and 54 are formed in the dies 22 and 24 at the surfaces 51 and 52. The keyways 53 and 54 extend perpendicularly to the surfaces 51 and 52 and define a longitudinal axis that is parallel to these surfaces. A key 55 is received in the keyways 53 and 54 so as to constrain the dies 22 and 24 relative to each other. The key 55 and keyways 53 and 54 align the dies 22 and 24 but permit movement of the surfaces 51 and 52 toward and away from each other in a direction perpendicular to these surfaces and permit movement of the dies 22 and 24 with the surfaces 51 and 52 maintaining their parallel, spaced relationship. Coil compression springs 56 and 57 are received in bores 58 and 59 formed in the die 24 at the base of the keyway 54. The springs 56 and 57 engage the key 55 and normally urge the dies 22 and 24 away from each other. The springs 56 and 57 exert a greater force on the dies 22 and 24 than the force exerted by the springs 35 and 47 for a reason that will become more apparent as this description proceeds.

The dies 23 and 25 also have respective surfaces 61 and 62 that face each other and which extend parallel to the surfaces 51 and 52 and normally to the surfaces 27 and 39, respectively. Keyways 63 and 64 are formed in the dies 23 and 25 adjacent the surfaces 61 and 62, respectively. A key 65 is received in the keyways 63 and 64. As with the key 55 and keyways 53 and 54, the key 65 and keyways 63 and 64 coact to constrain the dies 23 and 25 relative to each other while permitting movement of the surfaces 61 and 62 toward and away from each other in a direction perpendicular to these surfaces. In addition, the dies 23 and 25 may move relative to each other with the surfaces 61 and 62 moving in a direction parallel to these surfaces. Coil springs 66 are received in spaced bores 67 formed in the die 23 at the base of the keyway 63. The springs 66 engage the key 65 and urge the dies 23 and 25 away from each other. The springs 66 exert a greater force on the dies 23 and 25 than the force exerted by the springs 35 and 47.

The described die set is supported within the machine 21 within a cavity 71 formed by a main body portion 72 of the welding machine base. The dies 22 and 23 rest upon balls 73 that are supported in bores 74 at the base of the recess 71 and which are engaged by springs 75 positioned in these bores. The dies 22 and 23 are, therefore, urged upwardly into engagement with the accurately located lower surface of a respective one of a pair of retainer plates 76 and 77. The retainer plates 76 and 77 are held relative to the main body portion by means of wing nuts 78 that are threaded onto studs 79 which are fixed to the main body portion and extend upwardly through elongated apertures 81 formed in the respective plate 76 or 77.

The dies 24 and 25 are supported in the cavity 71 upon a plunger 82. The plunger 82 is reciprocally supported in a bore 83 formed in the body member 72 at the base of the cavity 71. The plunger 82, in turn, is supported upon an outstanding end 84 of a cut off lever 85. The cut off lever 85 is supported for pivotal movement by a pivot pin 86 (FIG. 1) that is staked to the main body portion 72. A spring 87 normally urges the cut off lever 85 in a counterclockwise direction so that the dies 24 and 25 are urged upwardly into engagement with a respective one of the plates 76 and 77.

Referring now specifically to FIGS. 3 and 11 through 15, the dies 22 and 24 have inclined surfaces 91 and 92, respectively, which surfaces are engaged by cooperating surfaces 93 and 94 of a die actuating V-block, indicated generally by the reference numeral 95. In a like manner, the dies 23 and 25 have inclined surfaces 96 and 97 that are engaged by cooperating surfaces 98 and 99 of a second die actuating V-block 101. The V-blocks 95 and 101 are supported for reciprocation within the cavity 71 between the retainer plates 76 and 77 and a horizontally extending surface 102 of the main body member 72.

The V-blocks 95 and 101 are formed with indentations 103 and 104 (FIG. 1) at their rear faces which are engaged by operating fingers 105 and 106 of a pair of operating levers 107 and 108, respectively. The operating levers 107 and 108 are pivotally supported relative to the main body member by pivot pins 109 and 111, respectively. A pair of face plates 112 and 113 (FIG. 2) having respective supporting legs 114 are secured to the main body member 72 in any known manner and enclose the operating mechanism including the operating levers 107 and 108.

The lower ends of the operating levers 107 and 108 carry pivot pins 115 and 116, respectively, which pivotally connect the operating levers to respective intermediate links 117 and 118. The opposite end of the links 117 and 118 are pivotally connected to operating members 119 and 121, respectively, by means of pivot pins 122 and 123. The operating members 119 and 121 are supported for reciprocation in a direction parallel to the direction of reciprocation of the die actuating V-blocks 95 and 101 within cavities 124 and 125 formed in the main body member 72.

The operating members 119 and 121 have inclined follower surfaces 126 and 127 that are engaged with a cam surface 128 of a first cam 129. The first cam 129 is supported for reciprocation within a vertically extending bore 131 formed in the main body member 72. The cam 129 is formed with a coaxial bore 132 through which a cylindrical portion 133 of an operating rod 134 extends. Adjacent the portion 133, the operating rod 134 is formed with a trunnion portion 135. The trunnion portion 135 is formed with an elongated slot 136 through which a pin 137 extends. The pin 137 is affixed to a bracket 138 of an operating handle assembly, indicated generally by the reference numeral 139. The bracket 138 is pivotally supported, by means of a pivot pin 141, within a recess 142 of the main body portion 72. The bracket 138 is formed with a tapped opening 143 into which a threaded operating handle portion 144 is received. The handle portion 144 has an elongated cylindrical shank 145 with a knob disposed at its outer end.

Referring now to FIG. 3 and primarily to FIGS. 11 through 16, a wire gripper and synchronizing arrangement is provided on each side of the machine and adjacent the V-blocks 95 and 101. The mechanism at each side of the machine is identical and thus only one side is shown in detail in FIGS. 11 through 15. This mechanism includes a pair of first generally L-shaped members 151 and 152, each of which has a respective wire engaging surface 153 and 154 formed along the inner extremity of its short leg. The members 151 and 152 are juxtaposed to the V-blocks 95 and 101 and are supported upon second members 155 and 156. The members 155 and 156 have portions 157 and 158 that extend upwardly into the gaps defined by the L-shape of the members 151 and 152, respectively.

The members 155 and 156 are operated by means of a second cam member 161 having a pointed cam portion 162 that is adapted to extend between adjacent inclined faces 163 and 164 of the members 155 and 156. The second cam member 161 is supported for reciprocation in a complementary recess 165 formed in the main body portion 72. A like cam member 166 (FIG. 2) is associated with the members 155 and 156 on the other side of the V-blocks 95 and 101. The cam member 166 is supported within a complementary recess 167 of the main body portion. The cam members 161 and 166 are interconnected by means of a longitudinally extending pin 168 that extends through respective openings 169 and 171 formed at the lower end of the cam members 161 and 166. The pin is held longitudinally in place by means of snap rings 173. Intermediate the cam members 161 and 166, the pin 168 is affixed to a rod 174. The rod 174 is received in a bore 175 formed in a sleeve 176 of a friction clutch (FIG. 1). A friction member 177 is slidably supported in a transverse bore 178 of the sleeve 176 and engages the rod 174. A cantilevered leaf spring 179 engages the outer side of the friction member 177 for urging it into frictional engagement with the rod 174 thereby completing the friction clutch assembly. The lower end of the sleeve 176 is formed with a female threaded opening 181 in which a male threaded portion 182 of the operating rod 134 is received. The lower end of the sleeve 176 is also formed with a reduced diameter cylindrical portion 183 that is received in a complementary counterbore 184 of the first cam 129.

The members 155 and 156 are formed with counterbores 191 and 192 in which bullet-shaped plunger members 193 and 194 are slidably supported. These plunger members have reduced diameter portions 195 and 196 that engage the adjacent sides of the dies 24 and 25. Again, it is to be understood that the like construction at the opposite side of the machine provides plungers that engage the dies 22 and 23 in the same manner as that illustrated. The upstanding portions 157 and 158 of the members 155 and 156 are bored, as at 197 (only the bore in the member 156 being illustrated). A pin 198 extends into the bore 197 and has a headed portion 199 that engages any suitable fixed portion of the machine. A coil compression spring 201 encircles the pin 198 and urges the respective member 155 or 156 into engagement with the second cam 161.

The members 151 and 152 are also bored at their outer end, as at 202 (again the construction at only one side is shown). A pin 203 extends into the bore 202 and has its enlarged head 204 in abutment with any fixed portion of the machine. A coil spring 205 encircles the pin 203 and engages the respective member 151 or 152 toward the wire end so that the wire engaging surfaces 153 and 154 are urged toward each other.

Figure 13:
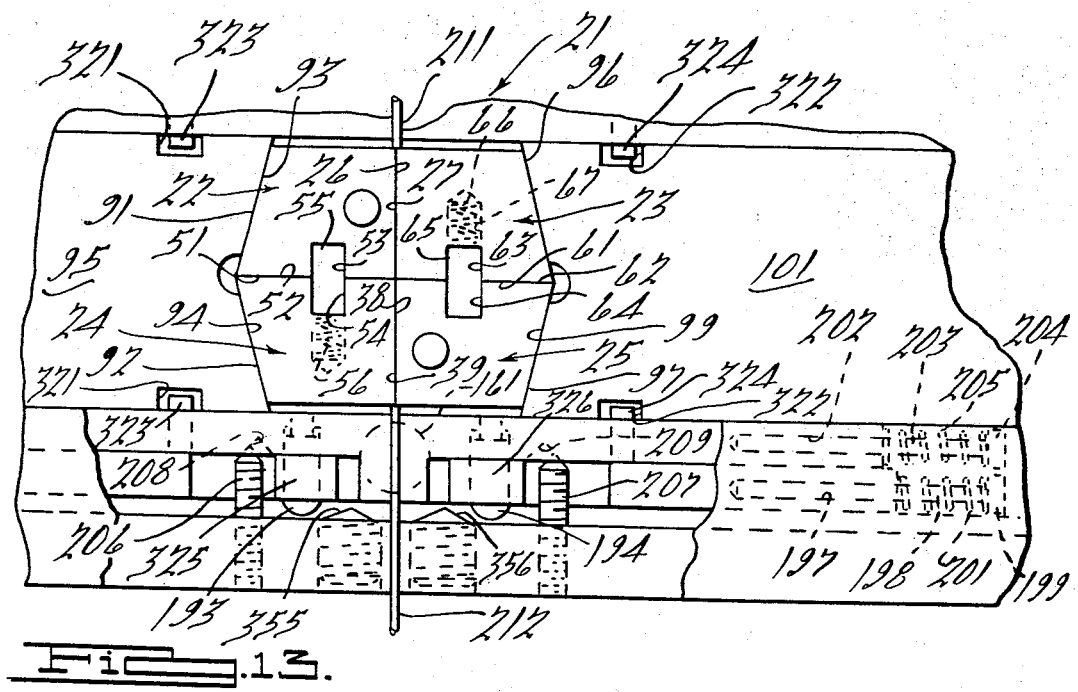
FIG. 13 is a view, in part similar to FIGS. 11 and 12, and shows the dies in their gripping-welding position.

The extreme inner movement of the members 151 and 152 is limited by respective adjustable screws 206 and 207 each of which has a pointed end that is adapted to engage a conical recess 208 and 209 formed in the members 151 and 152 for limiting the degree of inward movement (FIGS. 12 and 13). This adjustment permits the gap between the faces 153 and 154 to be adjusted so as to center the supported wire with respect to the adjacent pair of dies.

A wire locating and holding mechanism is provided for locating the ends of wires 211 and 212 wound upon spools 213 and 214, respectively. The locating and holding mechanism is incorporated so that the fine wires may be accurately positioned in the grooves 29 and 42 of the respective dies and so that the ends of the wires may be accurately sheared for subsequent butt welding. Extremely fine wires are difficult to accurately thread through the openings in the dies and the locating and holding mechanism now to be described by particular reference to FIGS. 2 and 3 assists in the loading operation and renders detailed threading unnecessary.

The locating and holding mechanism associated with the wire 211 comprises a first bullet-shaped locating member 215 that is fixed to an outwardly extending table portion 216 formed integrally with the main body member 72 on the side adjacent the first pair of dies 22, 23. The locating member 215 is formed with a groove 217 across which the wire 211 is adapted to be trained. A second bullet-shaped locating member 218 is affixed to an outwardly extending table portion 219 of the main body member 72 on the side adjacent the second pair of dies 24, 25. The locating member 218 is formed with a groove 221 that is aligned with the grooves 217 with the grooves 217 and 221 being aligned with the intermediate grooves 29 and 42 formed in the dies 22, 23 and 24, 25 when these dies are in the position shown in FIG. 2.

A first holding device, indicated generally by the reference numeral 223, is juxtaposed to the bullet-shaped locating member 215. A second holding device 224 is juxtaposed to the bullet-shaped locating member 218. Each of the holding devices 223 and 224 is comprised of a shank portion 225 having an adjacent head 226 which terminates in a frustoconical section 227. The lower end of the frustoconical section 227 defines a shoulder 228. A frustoconical member 229 is formed with a bore 231 that is slidably supported upon the shank 225 and which defines a shoulder 232 in facing relationship with the shoulder 228. A coil spring 233 is received in a recess 234 in the member 229 and urges the shoulder 232 toward the shoulder 228. The shank 225 of the holding device 223 is directly affixed to the table 216 in any suitable manner.

The holding device 224 is slidably supported so as to apply a tension on the free end of the wire 211. To this end, a reduced diameter cylindrical portion 236 of the shank portion 225 extends through an elongated slot 237 formed in the table portion 219. A nut 238 is received on a threaded end 239 of the shank to preclude axial disengagement. A shoe 241 engages the cylindrical portion 236 and is, in turn, engaged by a coil compression spring 242. The spring 242 is received in a bore 243 formed in the main body portion and normally urges the holding device 224 away from the corresponding holding device 223. The shoulders 228 of the respective holding devices 223 and 224 lie in substantially the same plane as the grooves 217 and 221 of the locating devices for a reason which will become more apparent as this description proceeds.

A second set of locating devices 251 and 252 are mounted at opposite ends of the machine and slightly inboard of the locating devices 215 and 218. The locating devices 251 and 252 are also formed with grooves 253 and 254, respectively. The grooves 253 and 254 lie in a common plane with the lowermost grooves 31 and 43 of the respective pairs of dies when the dies are in the position shown in FIG. 2. Associated with the locating devices 251 and 252 are holding devices 255 and 256 which are similar in construction to the holding devices 223 and 224. The holding device 256 which is juxtaposed to the spool 214 and which is adapted to coact with the wire 212 is fixed relative to the machine 21 while the holding device 255 is spring biased away from the dies in a manner similar to that employed with the holding device 224.

Figure 17:
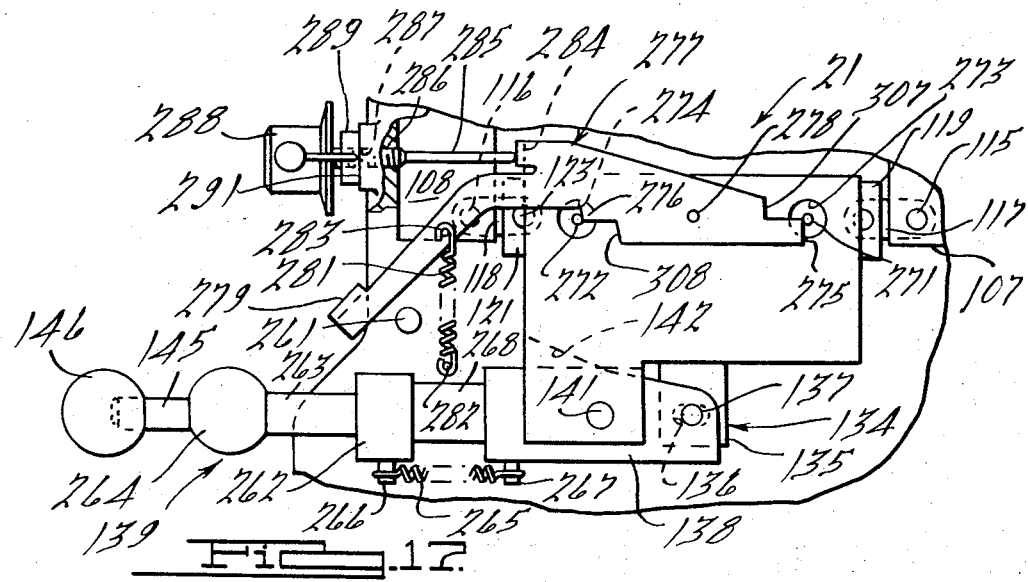
FIG. 17 is a side elevational view, with portions broken away, of the operating handle assembly.
Figure 18:
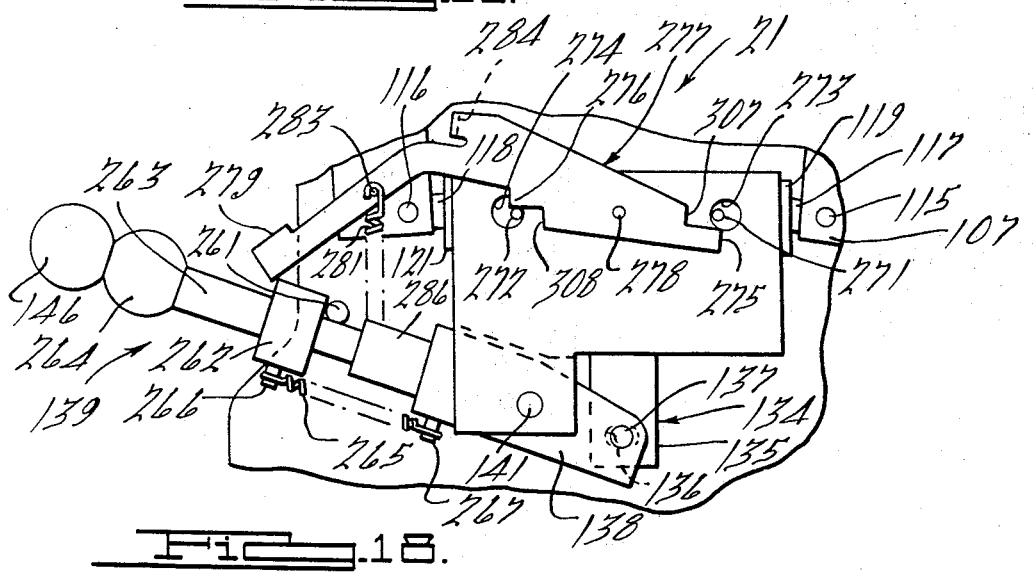
FIG. 18 is a side elevational view, in part similar to FIG. 17, showing the operating handle assembly in its loading position.

As will become more apparent as this description proceeds, oscillation of the operating handle assembly 139 about its pivot point 141 causes reciprocation of the V-blocks 95 and 101 and movement of the pairs of dies 22, 23 and 24, 25 from a normal released position as shown in FIG. 9 toward each other to a gripping position as shown in FIG. 8. In addition, the pairs of dies move from a retracted position wherein their surfaces 51, 52 and 61, 62 are spaced from each other to a welding position wherein these surfaces are brought into abutting engagement. The degree of pivotal movement of the operating handle assembly 139 during this movement which is utilized to achieve a multiple upset cold weld is limited by a fixed stop 261 (FIGS. 1, 17 and 18). The fixed stop 261 is engaged by an abutment member 262 in the form of a collar that is slidably supported upon the handle portion 145. The collar 262 is connected by means of a smaller diameter tubular member 263 to a release knob 264. A coil spring 265 is tensioned between a pin 266 fixed to the abutment member 262 and a pin 267 affixed to the operating handle bracket 138 for urging the abutment member 262 into engagement with a collar 268 that is fixed to the handle portion 145 adjacent the bracket 138. Pivotal movement in a clockwise direction of the operating handle assembly 136 will be limited by engagement of the abutment member 262 with the fixed stop 261 as should be readily apparent.

The actual degree of movement of the dies 22, 23 and 24, 25 to their retracted, normally opened position is limited by means of a pair of stop pins 271 and 272 that are affixed to the operating members 119 and 121, respectively, and which extend outwardly from one side of enlarged apertures 273 and 274 formed in the main body portion 72. The pins 271 and 272 are adapted to engage stop surfaces 275 and 276 formed on a stop lever, indicated generally by the reference numeral 277. The stop lever 277 is pivotally supported upon a pivot pin 278 and has an operating portion 279 in the form of an elongated lever that is juxtaposed to the stop member 261 and to the abutment member 262. A coil spring 281 is tensioned between a pin 282 fixed to the machine base and a pin 283 that is affixed to the operating portion 279 of the stop lever 277. The spring 281 urges the stop lever 277 in a counterclockwise direction so that a tang 284 formed integrally with the lever 277 is held in engagement with the end of an adjustment rod 285. The adjustment rod 285 has a threaded portion 286 received in a tapped hole 287 formed in the machine body 72 for axial movement of the rod 285 relative to the body 72. A knob 288 is affixed to the outer end of the adjustment rod 285 to facilitate this adjustment. In addition, a stop collar 289 is received on the threaded rod portion 286 and is adapted to be abuttingly engaged with a shoulder 291 of the body portion 72 for holding the adjustment rod 285 in its adjusted position.

The V-blocks 95 and 101 are normally urged to a retracted position by means of tension springs 295 and 296 (FIG. 1) that are affixed at one end to depending pins 297 and 298 fixed to the respective V-blocks. The opposite ends of the springs 295 and 296 are connected to pins 299 and 301 which are affixed to the operating levers 107 and 108, respectively, to normally bias these levers in a clockwise and counterclockwise direction, respectively.

OPERATION

In order to load the machine 21 to effect a multiple upset cold weld between the wires 211 and 212, the release knob 264 is grasped and pulled outwardly so that the abutment member 262 will clear the stop pin 261. The operating handle assembly 139 is then rotated in a clockwise direction about the pivot pin 141 to the position shown in FIG. 18. Upon this movement, the operating rod 134 will be drawn downwardly until a shoulder 305 formed at the bottom of the frictional clutch member 176 engages an oppositely facing shoulder 306 formed at the base of the counterbore 184 of the first cam 129. The cam 129 is, therefore, drawn downwardly so that the springs 295 and 296 may urge the operating members 119 and 121 inwardly. The clockwise rotation of the operating handle assembly 139 will bring the abutment member 262 into engagement with the stop lever operating portion 279 effecting rotation of the stop lever 277 in a clockwise direction about the pivot pin 278. The stop pins 271 and 272 carried by the operating members 119 and 121 will then register with cut outs 307 and 308 formed in the stop lever 277 adjacent the stop surfaces 275 and 276. The operating members 119 and 121 are, therefore, free to move to a fully retracted position.

The tension springs 295 and 296 will act on the V-blocks 95 and 101 to cause these V-blocks to move and follow with the operating fingers 105 and 106 at the upper end of the operating levers 107 and 108. The die block springs 35, 47, 56, 57 and 66 are then free to urge the die blocks 22, 23 and 24, 25 away from each other so that a gap exists between the surfaces 26 and 27 of the die pair 22, 23 and between the surfaces 38 and 39 of the die pair 24, 25. As shown in FIG. 10, this gap is greater than the diameter of the wire to be welded so that a wire may be inserted between these surfaces of the die blocks.

Figure 14:
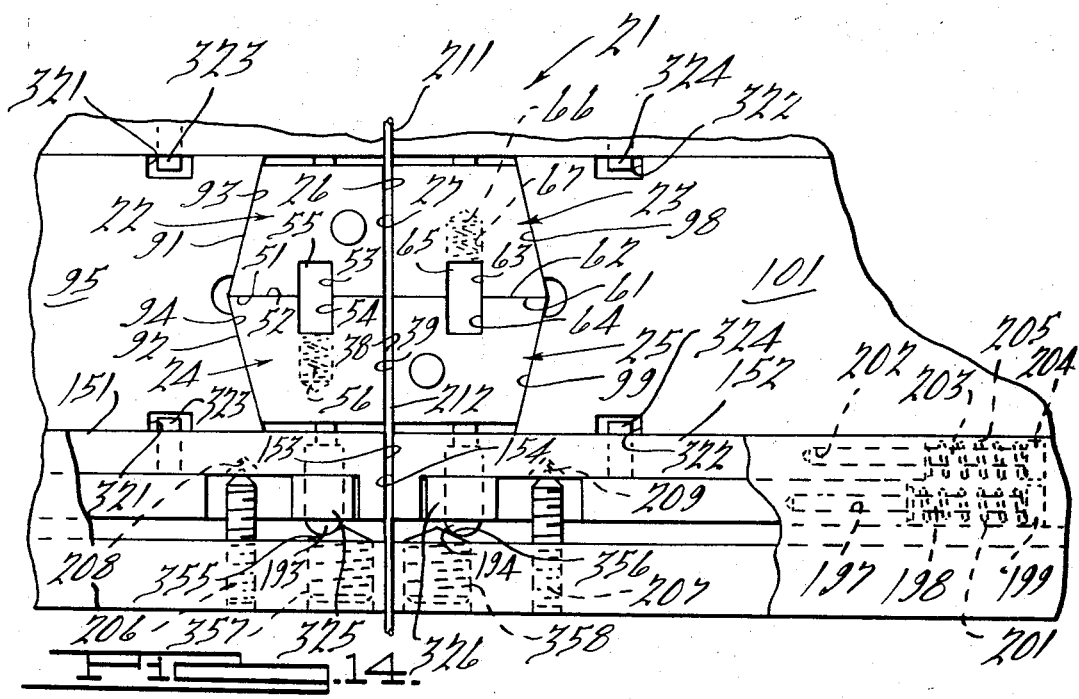
FIG. 14 is a view, in part similar to FIGS. 11 through 13, and shows the dies in their welding-opened positions.
Figure 15:
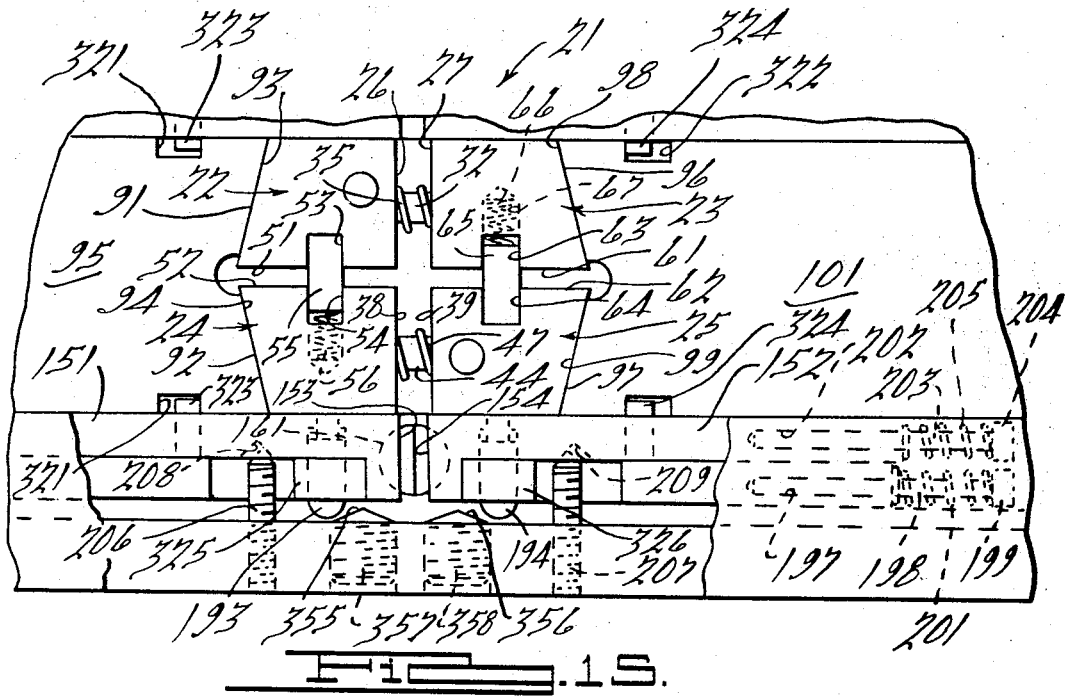
FIG. 15 is a view, in part similar to FIGS. 10 through 14, and shows the dies in a fully opened loaded position, thus corresponding to the die position shown in FIG. 10.
Figure 16:
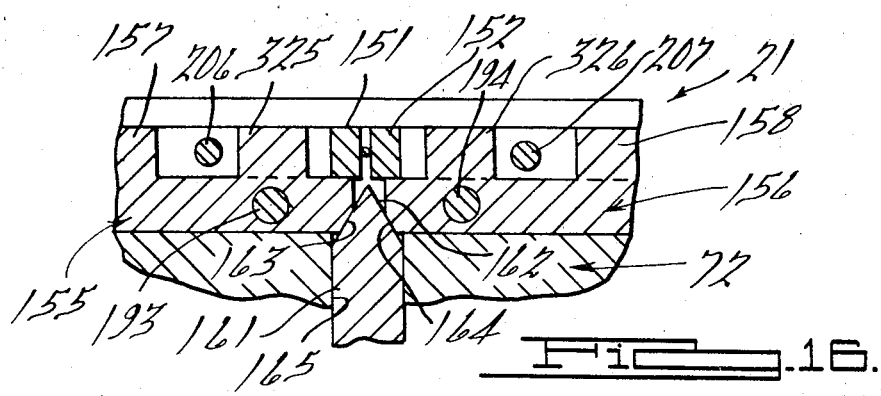
FIG. 16 is a cross-sectional view taken along the line 16—16 of FIG. 11.

In order to load wire into the machine 21, it is essential that the wire gripping members 151 and 152 be retracted along with the dies 22, 23, 24 and 25. To accomplish this, the V-blocks 95 and 101 are formed with recessed cut-outs 321 and 322 at each of their sides (FIGS. 11 through 15). Pins 323 and 324 are affixed to the members 151 and 152, respectively, and enter into these cut-outs 321 and 322. When the V-blocks 95 and 101 are retracted for loading, the cut-outs 321 and 322 will move sufficiently so that the V-blocks 95 and 101 engage the pins 323 and 324 to retract the members 151 and 152 against the action of the springs 205 (FIG. 15). At the same time, the short legs of the members 151 and 152 will engage upstanding projections 325 and 326 of the members 155 and 156 to retract these members against the action of the springs 201.

The wire 211 is stretched across the locating member grooves 217 and 221 and is snapped between the shoulders 228 and 232 of the holding devices 223 and 224. The conical surfaces 227 and 229 facilitate this insertion of the wire. At the same time, the holding device 224 is moved inwardly toward the die set compressing the spring 242. When the wire 211 is then released, the spring 242 will place a tension on the wire. As has already been noted, in this position the wire 211 is aligned with the smaller size grooves 29 and 42 of the respective dies 22, 23 and 24, 25. The wire 212 is then inserted in the holding devices 255 and 256 after being located by the locating devices 251 and 252 in a manner similar to that described in connection with the locating and holding of the wire 211. The wire 212 is then aligned with the larger size grooves 31 and 43 of the pairs of dies 22, 23 and 24, 25.

While the dies 22, 23 and 24, 25 are still in their opened positions, the pair of dies 24, 25 is depressed through the actuation of a die depressing lever, indicated generally by the reference numeral 327 (FIGS. 1 and 19). The die depressing lever is comprised of an offset of L-shaped lever arm 328 that is bifurcated and is pivotally supported, by pivot pins 329, on the machine 21. At the outer end of the lever 328, an engaging finger 330 is formed. When the die depressing mechanism 327 is pivoted about the pivot pins 329 into engagement with the dies, the dies 24 and 25 are engaged by the die engaging finger 330. The lever 328 is pivoted until it fully engages the top plate 76 at which time the pairs of dies 24, 25 is depressed so that the grooves 41 are aligned with the grooves 29 of the pair of dies 22, 23. The grooves 42 of the dies 24, 25 are, at this time, aligned with the grooves 31 of the dies 22, 23. The wire 211 will, therefore, be aligned with the grooves 41 and 29 and the wire 212 will be aligned with the grooves 42 and 31.

At this time, the operating handle assembly 139 is depressed and the abutment member 262 will be returned to the position shown in FIGS. 1 and 17 by the action of the spring 265. Upon depression of the operating handle assembly 139, the operating rod 134 will be moved upwardly. During initial upward movement of the operating rod 134, the first cam 129 will be held in its retracted position by means of a brake shoe 331 that engages the outer periphery of the first cam 129 and which is held in frictional engagement therewith by a coil spring 332 received in a counterbored opening 333 and reacting against a closure plug 334. Upon this upward movement, the shoulder 305 will move away from the shoulder 306 and a shoulder 335 formed at the top of the trunnion portion 135 will abuttingly engage an oppositely facing shoulder 336 formed at the bottom of the first cam 139. Continued downward movement of the operating handle assembly 139 will cause the first cam 129 to move upwardly driving the operating members 119 and 129 away from each other. This movement is transmitted through the operating levers 107 and 108 to inward movement of the die actuating V-blocks 95 and 101. The inclined faces 93, 94, 98 and 99 of the V-blocks 95 and 101 will, therefore, cause the dies of the pairs 22, 23 and 24, 25 to move toward each other through the sequence shown in FIGS. 10, 9 and 8. In addition, the pair of dies 22, 23 will move toward the pair of dies 24, 25 until the faces 51, 52 and 61, 62 are in abutment. It should be understood that the pair of dies 24, 25 is held depressed during this time and after completion of the downward movement of the operating handle assembly 139 the dies will be in the position shown in FIG. 5.

It should thus be readily apparent that the wire 211 will be received in the wire receiving cavity defined by the grooves 29 of the dies 22, 23 and will be loosely received in the cavity defined by the grooves 41 of the dies 24, 25. In a like manner, the wire 212 will be tightly gripped in the cavity defined by the grooves 42 of the dies 24, 25 and will be loosely received in the cavity defined by the grooves 31 of the dies 22, 23.

At this time, the die depressing mechanism 327 is returned to its inoperative position as shown in FIG. 1. The dies 24, 25 will be maintained in a depressed state by the friction between the V-blocks 95 and 101 and these dies.

The wires 211 and 212 are now sheared by depressing the cut off lever 85, which lever had previously been rotated in a counterclockwise direction due to the depression of the dies 24, 25. Depression of the cut off lever 85 causes a force acting through the plunger 81 urging the dies 24, 25 upwardly to the position shown in FIG. 4. The abutting surfaces 51, 52 and 61, 62 of the dies 22, 24 and 23, 25 effecting this cutting off of the wires 211 and 212. Cavities 341 and 342 formed in the respective die faces for receiving the flash during the multiple upset process as described in the aforenoted U.S. Pat. No. 3,106,013 will serve the function of facilitating shearing of the wires 211, 212. After the dies 24, 25 are elevated, their grooves 42 will be aligned with the grooves 29 of the dies 22, 23. The end of the wire 211 in the wire receiving cavity defined by the grooves 41 of the dies 24, 25 is scrap and may then be easily removed due to the relatively large dimension of this groove. The same is true with respect to the scrap end of the wire 212 which is received in the cavity defined by the grooves 31 of the pair of dies 22, 23. It will be noted that the grooves 28 and 43 serve no function during this process. The provision of these grooves, however, insures complete symetry so that the die set may be positioned in the butt welding apparatus 21 in either direction. The ends of the wires 211 and 212 received in the holding devices 223 and 256 is then released from these devices merely by pulling it outwardly. The thus sheared ends of the wires 211 and 212 are now welded together by a multiple upset welding technique of the type generally described in the aforenoted U.S. Pat. 3,106,013. In the butt welding machine 21, however, there are certain features not described in that application relating to the sequential operation of the dies.

Once the wires 211 and 212 have been cut and the scrap ends removed, the multiple upset cold weld may be accomplished. Considering now the sequence of operation and assuming that the operating handle assembly 139 has been pivoted in a clockwise direction about the pivot pin 141 as viewed in FIG. 1 until the collar 262 has engaged the stop 261 and then returned slightly downwardly to the position shown in FIG. 17 for a reason that will become apparent, the dies 22, 23, 24 and 25 are in an opened spaced position as shown in FIG. 11. The gap between the grooves 29 and 42 is exagerated in this view for the sake of illustration, it being understood that the dies will be in a position shown in FIG. 9 whereby the wire ends 211 and 212 may move freely with respect to the dies 222, 223, 224 and 225. The gripping members 151 and 152 will, however, hold the wires 211 and 212 against movement as a result of the force exerted by the springs 205.

The operating handle assembly 139 is now moved downwardly in a counterclockwise direction about the pivot pin 141, again as viewed in FIG. 1. Upon the initial downward movement, the operating rod 134 will commence to move upwardly. During this initial upward movement, the first cam 129 is held against movement by the action of the brake shoe 331 in the manner previously described. The second cams 161 and 166 will, however, commence movement and will move the members 155 and 156 outwardly and compress the springs 201. Since the members 155 and 156 are not connected to the members 151 and 152, this retraction of the members 155 and 156 will not affect the gripping of the wires 211 and 212.

After a slight time delay, the first cam shoulder 336 will be engaged by the shoulder 335 formed at the top of the trunnion portion 135 and the first cam 129 will be moved upwardly. This upward movement drives the operating members 119 and 129 away from each other causing the V-blocks 95 and 101 to be moved toward each other. The inclined surfaces of the V-blocks will exert a compressive force upon the dies 22, 23, 24 and 25. It has previously been noted that the springs 56, 57 and 66 exert a stronger force tending to hold the dies 22, 24 and 23, 25 away from each other than the force exerted by the springs 35 and 47 which hold the dies 22, 23 and 24, 25 away from each other. Thus, the initial movement of the V-blocks 95 and 101 toward each other will cause the surfaces 26, 27 and 38, 39 of the dies 22, 23 and 24, 25 to move into engagement with each other (FIG. 12) before any substantial movement of the die surfaces 51, 52 and 61, 62 toward each other. Thus, the wire ends 211 and 212 will be firmly gripped between the pairs of dies 22, 23 and 24, 25 before the welding motion of the dies commences.

Continued downward movement of the operating handle assembly 139 will then cause the surfaces 51, 52 and 61, 62 of the dies 22, 24 and 23, 25 to move into abutting relationship (FIG. 13). When this occurs, the wire ends 211 and 212 will be upset. The wires 211 and 212 slip through the members 151 and 152 at this time.

After the upset of the wire ends, the operating handle assembly 139 is again moved upwardly. Under this condition, the friction brake shoe 331 will again retard the movement of the first cam 129. The second cams 161 and 162 will, however, be actuated immediately and will be drawn downwardly. When this downward movement occurs, the springs 201 will force the members 155 and 156 toward each other and the bullet-like plungers 193 and 194 will engage tapered surfaces 355 and 356 of screws 357 and 358 that are threaded into the machine base. Hence, the plungers 193 and 194 will be driven inwardly so that their cylindrical portions 195 and 196 engage the respective adjacent dies 22, 24 and 23, 25 (FIG. 14). Upon further downward movement of the operating rod 133, the shoulder 305 of the frictional clutch contacts the shoulder 306 of the first cam 129 causing it to move downwardly. The pin 168 will hold the first cams 161 and 162 against any further movement and the frictional clutch will slip under this condition. As the first cam 129 moves downwardly, the springs 35 and 47 will urge the dies 22, 23 and 24, 25 away from each other while the die surfaces 51, 52 and 61, 62 are held in engagement by the plungers 193 and 194. At the time the operating handle assembly 139 has been moved to the limit of its normal upward movement, the dies 22, 23 and 24, 25 will have been released from their gripping positions with the wire ends 211 and 212. The wire ends will, however, be held against any movement by the spring biased gripping members 151 and 152.

Upon the next downward movement of the operating handle assembly 139, the second cams 161 and 166 will begin to move upwardly before the first cam 139 commences its upward movement. At this time, the plungers 193 and 194 will be moved away from the dies 22, 24 and 23, 25. The dies are then free to move to their fully opened retracted positions (FIG. 11). It should be noted that the retraction of the dies 22, 23 and 24, 25 away from their welding position is accomplished while these dies are in their opened position. Hence, they will exert no drag on the wire ends 211, 212 that would tend to tear apart the previously made weld. Continued downward movement of the operating handle assembly 139 will cause another upset of the wire ends in the manner previously described.

The described technique is repeated several times to accomplish a multiple upset and the welded wire ends may then be removed from the machine by again moving the operating handle assembly to the position shown in FIG. 18 wherein the dies 22, 23, 24 and 25 are completely opened to the position shown in FIGS. 10 and 15.

What is claimed is:

1. A die set for a cold welding machine or the like comprising a first die, a second die, said first die and said second die comprising a pair, said first die and said second die having facing surfaces adapted to grippingly engage a workpiece, a third die, a fourth die, said third die and said fourth die comprising a pair, said third and said fourth die having facing surfaces adapted to grip a workpiece, a first spring interposed between said first die and said second die for urging said facing surfaces of said first die away from said facing surface of said second die, a second spring interposed between said third die and said fourth die for urging said facing surface of said third die away from said facing surface of said fourth die, a third spring interposed between said first die and said third die for urging said first die away from said third die, and a fourth spring interposed between said second die and said fourth die for urging said second die away from said fourth die, the force exerted by said third and fourth springs being greater than the force exerted by said first and said second springs.

2. A die set as set forth in claim 1 further including pin means extending between said pairs of the dies for aligning the pairs of dies with respect to each other and key and keyway means between the first and third dies and the second and fourth dies for aligning said dies with respect to each other while permitting movement therebetween along the axis of said keys.

* * * * *